(12) United States Patent
Arslan et al.

(10) Patent No.: US 12,603,749 B1
(45) Date of Patent: Apr. 14, 2026

(54) SYSTEM AND METHOD FOR IN-BAND FULL-DUPLEX WAVEFORM COEXISTENCE FOR JOINT COMMUNICATION AND SENSING (JCAS)

(71) Applicant: University of South Florida, Tampa, FL (US)

(72) Inventors: Huseyin Arslan, Tampa, FL (US); Joshua Karl Thomas Ranstrom, Bradenton, FL (US); Mehmet Mert Sahin, Tampa, FL (US)

(73) Assignee: University of South Florida, Tampa, FL (US)

( * ) Notice: Subject to any disclaimer, the term of this patent is extended or adjusted under 35 U.S.C. 154(b) by 313 days.

(21) Appl. No.: 18/462,632

(22) Filed: Sep. 7, 2023

Related U.S. Application Data

(60) Provisional application No. 63/404,271, filed on Sep. 7, 2022.

(51) Int. Cl.
*H04L 5/14* (2006.01)
*G01S 7/00* (2006.01)

(52) U.S. Cl.
CPC ............... *H04L 5/14* (2013.01); *G01S 7/006* (2013.01)

(58) Field of Classification Search
CPC .......... H04B 1/123; H04B 1/44; H04B 1/525; G01S 7/006; H04L 5/14; H04L 5/1461
See application file for complete search history.

(56) References Cited

U.S. PATENT DOCUMENTS

| | | | | |
|---|---|---|---|---|
| 9,813,222 | B2 * | 11/2017 | Shimizu | .............. H04W 40/005 |
| 10,419,062 | B2 * | 9/2019 | Doane | ...................... H04B 1/44 |
| 10,782,390 | B2 | 9/2020 | Lien et al. | |
| 11,057,067 | B1 * | 7/2021 | Hickle | ................... H04B 1/109 |
| 2020/0174095 | A1 * | 6/2020 | Altintas | ............... G01S 13/345 |
| 2021/0126669 | A1 | 4/2021 | Roberts et al. | |
| 2021/0273773 | A1 * | 9/2021 | Yi | ......................... H04L 5/1461 |
| 2023/0362898 | A1 * | 11/2023 | Jeon | ...................... G01S 7/0235 |

FOREIGN PATENT DOCUMENTS

| | | |
|---|---|---|
| CN | 106772336 A | 5/2017 |
| CN | 106817134 A | 6/2017 |

OTHER PUBLICATIONS

Al-Salehi et al., A Comprehensive Survey of Joint Radar-Communication Technologies and their future Applications in Healthcare Sector, IEEE, 26 pages, 2016.*
Hassani et al., In-Band Full-Duplex Radar-Communication System, IEEE, 12 pages, Mar. 2021.*

(Continued)

*Primary Examiner* — Frank Duong
(74) *Attorney, Agent, or Firm* — Molly L. Sauter; Trenam Law

(57) ABSTRACT

In various embodiments, the present invention provides joint communication and sensing (JCAS) for in-band full duplex (IBFD) communication, wherein the transmitting device performs transmission of superimposed data and radar signals while simultaneously receiving a data signal. A self-interference cancellation process is additional implemented either in parallel with a conventional SI cancellation scheme or in series with a SI cancellation stage that handles multipath components.

18 Claims, 3 Drawing Sheets

(56)                    References Cited

OTHER PUBLICATIONS

Barneto, Analysis and Design of Joint Communication and Sensing for Wireless Cellular Networks, Tampere University Dissertations 630, 184 pages, Jun. 28, 2022.*

Hassani et al., Joint In-Band Full-Duplex Communication and Radar Processing, IEEE, 9 pages, Jun. 2022.*

Li Chen et al. "Full-Duplex SIC Design and Power Allocation for Dual-Functional Radar-Communication Systems" Feb. 2023. IEEE Wireless Communications Letters. vol. 12, No. 2, pp. 252-256.

Seyed Ali Hassani et al. "Adaptive Filter Design for Simultaneous In-band Full-duplex Communication and Radar" 2020 17th European Radar Conference (EuRAD), Utrecht, Netherlands, 2021, pp. 5-8.

Carlos Baquero Barneto et al. "Full Duplex Radio/Radar Technology: The Enabler for Advanced Joint Communication and Sensing" Feb. 2021. IEEE Wireless Communications. IEEE Wireless Communications, vol. 28, No. 1, pp. 82-88.

Seyed Ali Hassani et al. "In-Band Full-Duplex Radar-Communication System" Mar. 2021. IEEE Systems Journal, vol. 15, No. 1, pp. 1086-1097.

Hardik B. Jain et al. "Enabling In-Band Coexistence of Millimeter-Wave Communication and Radar" 2020 IEEE International Radar Conference (RADAR), 2020, pp. 772-777.

Ian P. Roberts et al. "Equipping Millimeter-Wave Full-Duplex with Analog Self-Interference Cancellation" 2020 IEEE International Conference on Communications Workshops (ICC Workshops), 2020, pp. 1-6.

* cited by examiner

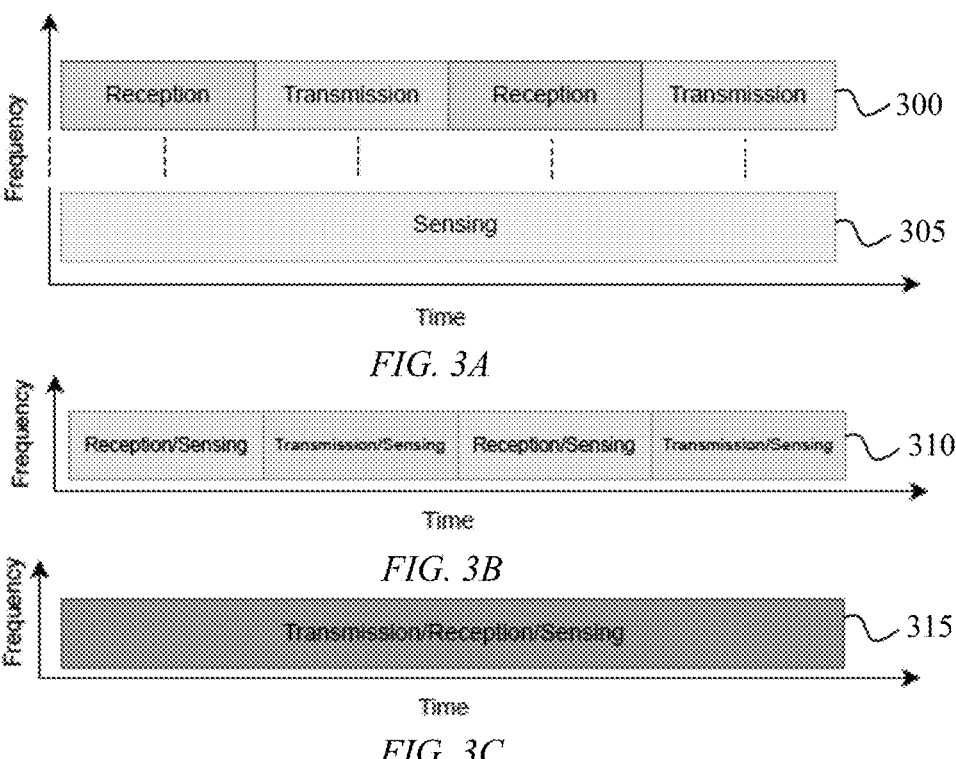
FIG. 3A
FIG. 3B
FIG. 3C
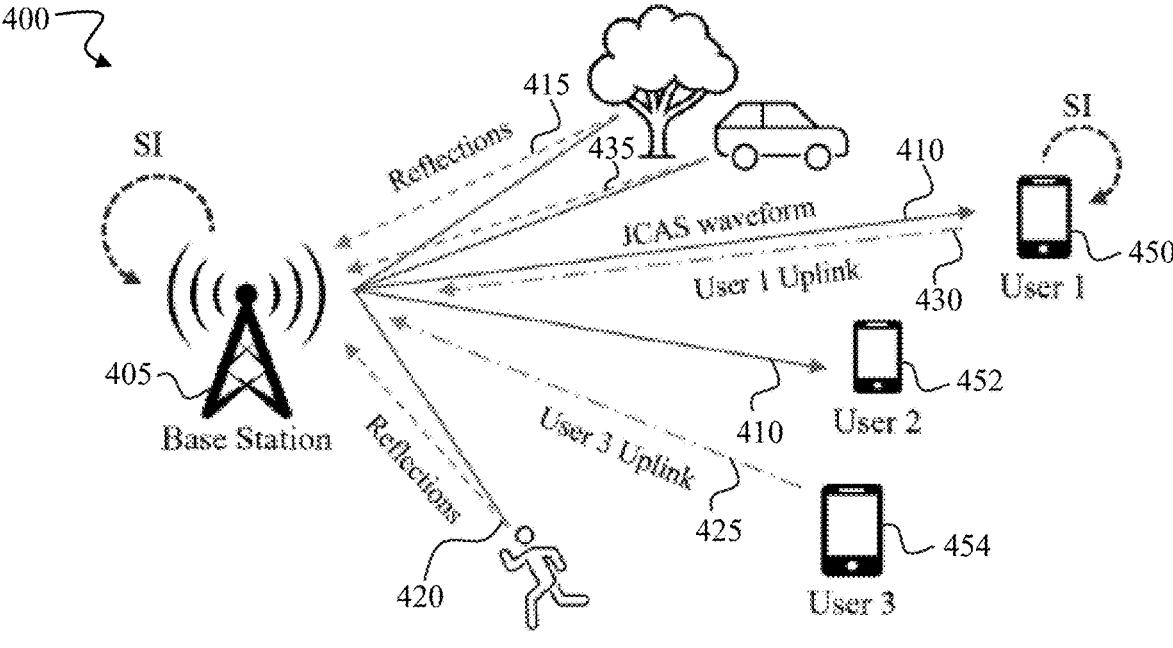
FIG. 4

500

502

SYSTEM AND METHOD FOR IN-BAND FULL-DUPLEX WAVEFORM COEXISTENCE FOR JOINT COMMUNICATION AND SENSING (JCAS)

CROSS-REFERENCE TO RELATED APPLICATIONS

This application claims priority to U.S. Provisional Patent Application No. 63/404,271, filed Sep. 7, 2022, entitled "System and Method for In-Band Full-Duplex Waveform Coexistence for Joint Communication and Sensing (JCAS), the entirety of which is incorporated herein by reference.

BACKGROUND OF THE INVENTION

A goal of joint communication and sensing (JCAS) is to solve the spectral congestion problem by designing more efficient systems that jointly exploit both functionalities utilizing the same resource blocks. For example, a base station (BS) may be employed that is equipped with JCAS capabilities by using a modified OFDM waveform for both communication and radar purposes. Such a system uses an altered self-interference (SI) cancellation scheme to enable simultaneous transmission and reception of its reflected signal. However, in these systems, it is only known to perform sensing during communication transmission.

In contrast, other known systems consider JCAS in the form of joint Doppler radar operation and communication. In such studied transceivers, radar operations were performed using a waveform-independent approach. Hence, utilizing a communication signal, would enable the transceiver to perform simultaneous Doppler radar operations and in-band full duplex (IBFD) communication.

Systems are known that implement single channel full duplex joint radar and communication between communication devices. However, the wireless communication chipsets are known to be used for wireless communication or radar sensing, but not both simultaneously.

Accordingly, what is needed in the art is an improved system and method for joint radar and in-band full duplex (IBFD) communication, wherein the transmitting device is capable of performing transmission of superimposed data and a radar signal while simultaneously receiving a data signal.

SUMMARY OF INVENTION

In various embodiments, the present invention provides a novel joint communication and sensing (JCAS) scheme for in-band full duplex (IBFD) radio communication, where the transmitting device is performing transmission of superimposed data and a radar signal while simultaneously receiving a data signal. The methods of the present invention utilize superimposed communication and sensing waveforms combined with IBFD-capable radios having self-interference (SI) cancelation in order to achieve sensing, transmission, and reception using the same time and frequency resource. This configuration enables simultaneous sensing, communication transmission and reception using the same central frequency such that any one among (i) sensing and transmission, (ii) sensing and reception, (iii) transmission and reception (IBFD), or (iv) sensing, transmission, and reception, can be performed.

In one embodiment, the present invention provides a method for in-band full duplex (IBFD) radio communication. The method includes, transmitting a superimposed communication and sensing signal from a transceiver and receiving a communication signal at the transceiver while substantially simultaneously transmitting the superimposed communication and sensing signal from the transceiver. In particular, the transmitting and receiving utilize a same center frequency. The transceiver is additionally configured to generate the superimposed communication and sensing signal and to separate a reflected superimposed communication and sensing signal into respective waveform components.

The method may further includes performing self-interference (SI) cancellation of the reflected communication signal at the transceiver. The SI cancellation may be comprised of both direct SI cancellation and multipath SI cancellation. Additionally, the direct SI cancellation may be performed in series with, or in parallel with, the multipath SI cancellation.

In an additional embodiment, an in-band full duplex (IBFD) transceiver is provided. The transceiver includes, a transmitter comprising circuitry to transmit a superimposed communication and sensing signal and a receiver comprising circuitry to receive a communication signal at the transceiver while substantially simultaneously transmitting the superimposed communication and sensing signal from the transmitter, utilizing a same center frequency.

The transceiver includes circuitry to superimpose the communication signal and the sensing signal at the transceiver to generate the superimposed communication and sensing signal. The transceiver additionally includes circuitry to perform waveform separation of the transmitted superimposed communication and sensing signal.

The transceiver also includes circuitry to receive a reflected superimposed communication and sensing signal at the transceiver and to perform self-interference (SI) cancellation of the reflected communication signal. The SI cancellation may include both direct SI cancellation and multipath SI cancellation, which may be implemented either serially or in parallel.

According to the various embodiments, at least one transceiver is assumed to have the ability to simultaneously transmit and receive using the same center frequency and is additionally fitted with the capability of superimposing different waveforms to form it's transmit signal. This enables signals for different purposes to utilize the same time and frequency resources. The receiving radio is capable of separating the different sensing and communication waveforms sent in the superimposed format by the transceiver, in order to extract its relevant information. The receiving radio is also capable of separating the received the superimposed signal from another communication signal received from a different transceiver.

Accordingly, the present invention provides an improved system and method for joint radar and IBFD communication, wherein the transmitting device is performing transmission of superimposed data and the radar signal while simultaneously receiving a data signal.

BRIEF DESCRIPTION OF THE DRAWINGS

For a fuller understanding of the invention, reference should be made to the following detailed description, taken in connection with the accompanying drawings, in which:

FIG. 3A illustrates a conventional resource allocation scheme, where communication is performed in a time-division duplexing (TDD) fashion and continuous sensing is performed in a separate frequency band.

FIG. 3B illustrates a resource allocation scheme in accordance with the present invention wherein sensing is performed during both transmission and reception while maintaining the TDD communication structure.

FIG. 3C illustrates a resource allocation scheme in accordance with the present invention wherein sensing is performed during both transmission and reception using the same time and frequency resources.

FIG. 4 illustrates a general IBFD-JCAS scheme, in accordance with an embodiment of the present invention.

DETAILED DESCRIPTION OF THE INVENTION

In various embodiments, the present invention proposes a system and method for providing joint communication and sensing (JCAS) using superimposed communication and sensing waveforms for in-band full duplex (IBFD) capable radios. In contrast with other known systems, the proposed system and method are applied to the specific case of IBFD-JCAS radios, thereby enabling simultaneous sensing, communication transmission and reception using the same center frequency. Furthermore, in contrast to previous work, this scheme can provide flexibility by providing one of the combinations of: sensing and transmission; sensing and reception; transmission and reception (IBFD); or sensing, transmission, and reception. This flexibility allows the system to still remain functional even when a communication signal quality is low or inadequate self-interference (SI) cancellation is being experienced.

Figure 1:
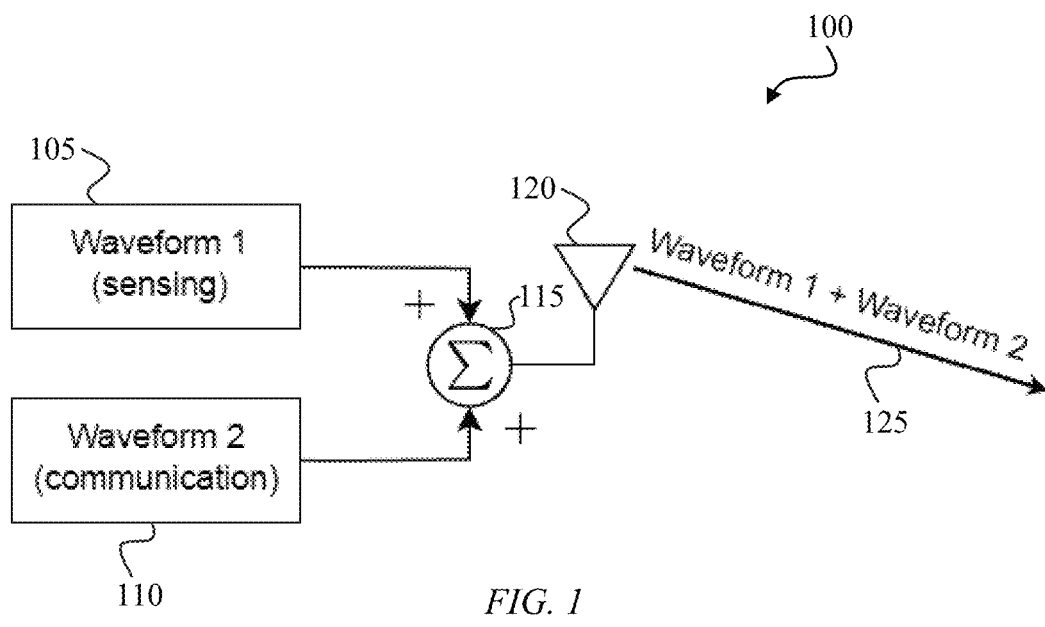
FIG. 1 illustrates a simplified in-band full duplex (IBFD)-joint communication and sensing (JCAS) transmitter to superimpose two different dedicated waveforms, in accordance with an embodiment of the present invention.

As illustrated with reference to FIG. 1, in one proposed embodiment of the invention, at least one transceiver 100 is assumed to have the ability to simultaneously transmit and receive using the same center frequency. Additionally, the transceiver 100 comprises hardware and software to provide the capability of superimposing different waveforms (i.e., waveform 1 and waveform 2) to form a transmit signal 125. In particular, waveform 1 105 may be a sensing signal and waveform 2 110 may be a communication signal. The superimposing circuitry 115 of the transceiver 100 superimposes waveform 1 105 and waveform 2 110 to generate the transmit signal 125 which is then transmitted from an antenna 120 of the transmitter 100. The transmitter 100 enables signals intended for different purposes (i.e., waveform 1 (sensing), waveform 2 (communication)) to utilize the same time and frequency resources.

However, superimposing the waveforms, as described with reference to FIG. 1, also requires that a receiving radio have the means to separate the different waveforms to extract its relevant information. An IBFD-JCAS radio in accordance with the present invention, includes the necessary hardware and software to separate the superimposed waveforms and to separate the sensing and communication waveforms and also to separate reflected versions of the superimposed in the signal that have been reflected back to the transceiver. Additionally, the IBFD-JCAS radio also includes circuitry to differentiate a potentially received communication signal coming from another radio from the reflected signals.

Figure 2:
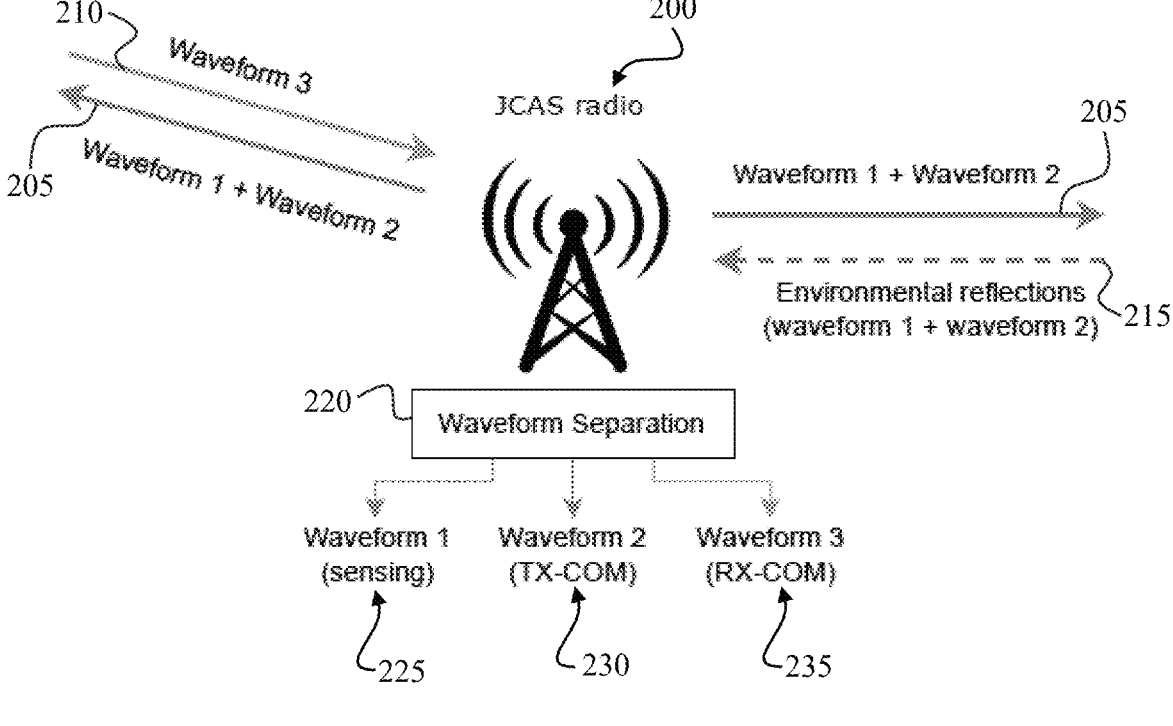
FIG. 2 illustrates an IBFD-JCAS transceiver, in accordance with an embodiment of the present invention.

The operation of an exemplary IBFD-JCAS radio 200 is illustrated with reference to FIG. 2. As show in FIG. 2, the IBFD-JCAS radio 200 transmits a superimposed waveform comprising waveform 1 and waveform 2 205 to one or more other transceivers. The IBFD-JCAS radio 200 receives waveform 3 210 from another radio and a signal comprising environmental reflections of waveform 1 and waveform 2 215. The IBFD-JCAS radio 200 includes waveform separation circuitry 220 that separates each of the received waveforms as waveform 1 (sensing) 225, waveform 2 (TX-COM) 230 and waveform 3 (RX-COM) 235. As such, an IBFD-JCAS radio 200 in accordance can separate a sensing waveform 225 and a communication waveform 230 from a received superimposed waveform 215 and also distinguish the superimposed waveforms 225, 230 from another received waveform 235. Performing sensing, transmission and reception simultaneously using the same frequency resources results in a more economical resource utilization.

The superimposing of waveform 1 205 and waveform 2 210 could be achieved by addition of the two waveforms in the time domain, which is easily performed in the digital domain. In contrast, the superimposing with waveform 3 235 occurs inherently in the propagation environment. As the waveforms are superimposed, they also need to be separable at the receiver. In theory, as long as the radar signal is known at the receiver (base station or a distant user), it can be estimated and subtracted from the received signal. However, additional separability can be achieved by, for the two waveforms, using different modulations (such as OFDM and Direct Spread Spectrum), pulse-shaping or power allocation or any combination of these. Such choice of different waveforms can enhance the separability, leading to improved performance.

FIG. 3A illustrates a conventional resource allocation scheme, where communication is performed in a time-division duplexing (TDD) fashion 300, and continuous sensing is performed in a separate frequency band 305. Being able to perform sensing during both transmission and reception, as in the proposed invention, may either maintain the TDD communication structure while simultaneously performing sensing 310, as shown in FIG. 3B, or perform sensing, transmission and reception using the same time and frequency resources 315 as shown in FIG. 3C. While there is no capacity gain in terms of the communication when going from the scheme in FIG. 3A to the scheme in FIG. 3B, the spectrum utilization is noticeably reduced since sensing does not need to occur in a separate frequency band. When all operations are performed simultaneously and within the same frequency band, as in the scheme illustrated in FIG. 3C, there is also a capacity gain on par with that of IBFD communication.

An exemplary embodiment 400 of the present invention is depicted in FIG. 4 where the base station (BS) 405 includes hardware and software for implementing IBFD-JCAS capabilities. Hence, at a given time, the BS 405 transmits a signal 410 having superimposed sensing and communication waveforms, while simultaneously receiving other signals 415, 420, 425, 430, 435. In the given scenario, User 1 450 and User 2 452 receives the signal 410 from the BS 405 and use separability techniques in the waveform domain to extract their information of interest. At the same time, User 1 (IBFD enabled) 450 and User 3 454, transmit respective communication signals 430, 425 to the BS 405.

The BS 405 also receives reflected signals 415, 420, 435, resulting from the reflection of its own transmitted signal 410 off objects in the environment, in addition to signals from other users. The BS 405 then uses self-interference (SI) cancellation and the waveform separation techniques to obtain the different waveforms and extract sensing data as well as communication data coming from the different users.

While the exemplary embodiment illustrated FIG. 4 is depicted as a centralized network with a BS, it should be noted that the proposed scheme may be used in other types of networks and communication, such as vehicle-to-vehicle, or vehicle-to-infrastructure, where sensing is already extensively used.

In order to enable simultaneous transmit and receive radio (STAR) operations, a transceiver needs to be able to address the self-interference (SI) created by its own signal transmissions. The SI is often divided into two parts referred to as direct path SI and multipath SI. Direct path SI refers to the SI resulting from TX/RX leakage within the transceiver itself, the line-of-sight component (separate TX and RX antennas), or the reflected multipath components with very short delays. The multipath SI results from the reflection of the transmitted signal off objects in the environment. Typically, the cancellation of both SI components (direct and multipath) is desired for IBFD operations. However, the multipath components are of particular interest when considering sensing in the form of radar.

As such, in the various embodiments of the present invention, a modified SI cancellation scheme may be implemented that focuses on cancelling the direct SI components. Extending on this idea, it is here proposed that such SI cancellation is implemented, either in parallel with a conventional SI cancellation scheme, or in series with an SI cancellation stage that handles multipath components. What this achieves, is the separation of the transmitted signal and the received communication signal, as illustrated in FIG. 5A and FIG. 5B.

Figure 5A:
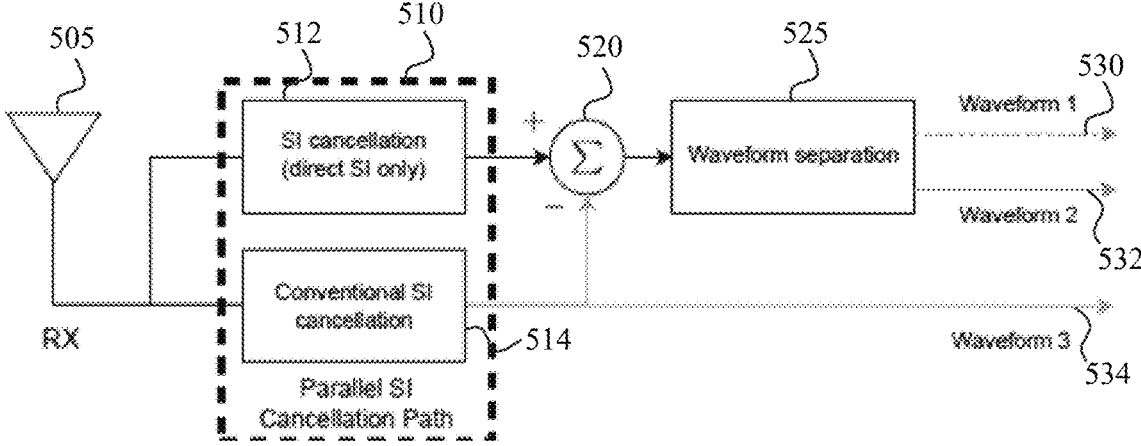
FIG. 5A illustrates a proposed parallel self-interference (SI) cancellation for an IBFD-JCAS transceiver, in accordance with an embodiment of the present invention.

As shown in FIG. 5A, a system 500 for implementing modified SI cancellation using a parallel SI cancellation path 510 is illustrated. In this system 500, a signal received at a receiving antenna 505 is transmitted in parallel to SI cancellation circuitry 512 for performing direct SI only and to conventional SI cancellation circuitry 514. Waveform 3 534 results from the conventional SI cancellation 514. The signal resulting from the SI cancellation (direct SI only) 512 and waveform 3 534 are then superimposed at element 520 and the resulting superimposed waveform is then separated at the waveform separation circuitry 525, resulting in the generating of waveform 1 530 and waveform 2 532.

Figure 5B:
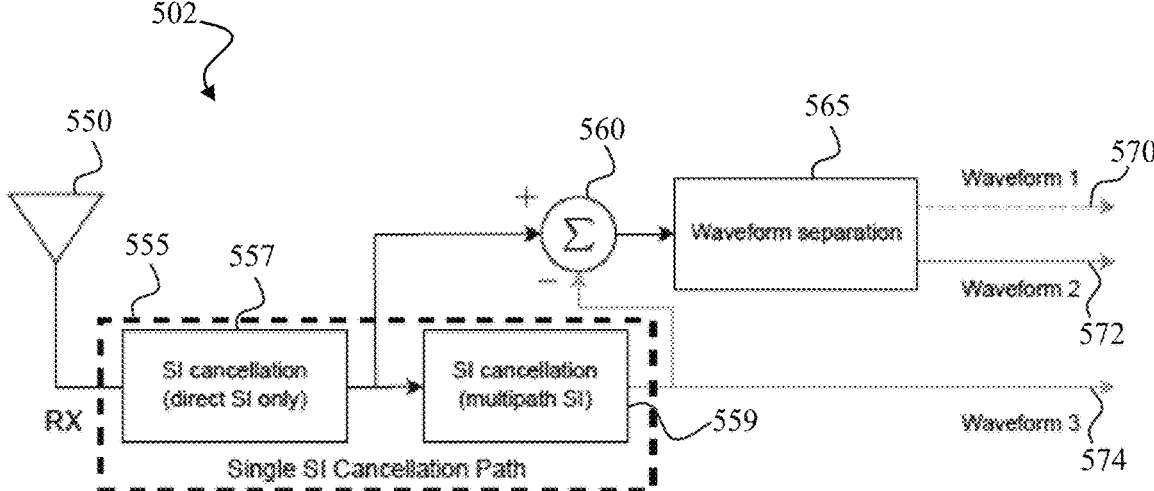
FIG. 5B illustrates a proposed single self-interference (SI) cancellation for an IBFD-JCAS transceiver, in accordance with an embodiment of the present invention.

As shown in FIG. 5B, a system 502 for implementing modified SI cancellation using a single SI cancellation path 555 is illustrated. In this system 502, a signal received at a receiving antenna 550 is transmitted first to SI cancellation circuitry 557 for performing direct SI only and then to conventional SI cancellation circuitry 559. Waveform 3 574 results from the direct SI only cancellation 557 followed by the conventional SI cancellation 559. The signal resulting from the SI cancellation only (direct SI only) 555 and waveform 3 574 are then superimposed at element 560 and the resulting superimposed waveform is then separated at the waveform separation circuitry 565, resulting in the generating of waveform 1 570 and waveform 2 572.

The systems 500, 502 illustrated in FIG. 5A and FIG. 5B may be either implemented in analog circuitry or in the digital domain. However, as the power of the direct SI components are generally very high relative to the communication signal, which is to be received, analog suppression of these components may be necessary in order to avoid saturation in the analog-to-digital conversion.

It may also be noted that if no communication signal was present, then the waveform 3 path 534 (FIG. 5A), 574 (FIG. 5B) could be utilized to perform spectrum monitoring, to identifying interference or to detect malicious jammers.

It should be noted that the proposed system and method is distinct from previously presented approaches, where one waveform is altered to support both communication and sensing applications. Instead, the various embodiments of the present invention propose to use different waveforms specified to different applications considering full-duplex rationale. Exploiting lattice structures, pulse shapes and dedicated symbols in different waveforms, their separability property can be further improved by using full-duplex structures. Moreover, dedicated waveforms can be generated to exploit full-duplex integrity of joint communication and sensing systems.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for in-band full duplex (IBFD) radio communication, the method comprising:
   transmitting a superimposed communication and sensing signal from a transceiver;
   receiving, from another transceiver, a communication signal at the transceiver while substantially simultaneously transmitting the superimposed communication and sensing signal from the transceiver, wherein transmitting the superimposed communication and sensing signal and receiving the communication signal from the other transceiver utilize the same time and frequency resources of the transceiver;
   receiving a reflected superimposed communication and sensing signal at the transceiver;
   performing waveform separation of the reflected superimposed communication and sensing signal at the transceiver to extract;
      a sensing waveform and a communication waveform from the reflected superimposed communication and sensing signal; and
      a communication waveform from the communication signal received from the other transceiver.

2. The method of claim 1, wherein transmitting the superimposed communication and sensing signal and receiving the communication signal from another transceiver utilize a same center frequency.

3. The method of claim 1, further comprising superimposing the communication signal and the sensing signal at the transceiver to generate the superimposed communication and sensing signal.

4. The method of claim 1, further comprising performing self-interference (SI) cancellation of the reflected superimposed communication and sensing signal to suppress only direct SI while preserving multipath SI.

5. The method of claim 1, further comprising
   performing self-interference (SI) cancellation of the reflected superimposed communication and sensing signal at the transceiver.

6. The method of claim 5, wherein performing SI cancellation of the reflected communication and sensing signal at the transceiver comprises:
   performing direct SI cancellation; and
   performing multipath SI cancellation.

7. The method of claim 6, wherein performing direct SI cancellation and performing multipath SI cancellation are implemented in parallel.

8. The method of claim 6, wherein performing direct SI cancellation and performing multipath SI cancellation are implemented in series.

9. A method for in-band full duplex (IBFD) radio communication, the method comprising:
   generating a superimposed communication and sensing signal at a transceiver;
   transmitting the superimposed communication and sensing signal from the transceiver;
   receiving a communication signal at the transceiver while substantially simultaneously transmitting the superimposed communication and sensing signal from the transceiver;
   receiving a reflected superimposed communication and sensing signal at the transceiver; and
   performing waveform separation of the transmitted superimposed communication and sensing signal at the transceiver.

10. The method of claim 9, further comprising:

performing self-interference (SI) cancellation of the reflected communication signal at the transceiver.

11. An in-band full duplex (IBFD) transceiver comprising:

a transmitter comprising circuitry to transmit a superimposed communication and sensing signal;

a receiver comprising circuitry to receive a communication signal, from another transceiver, while substantially simultaneously transmitting the superimposed communication and sensing signal from the transmitter, wherein the transmitter and the receiver utilize the same time and frequency resources of the transceiver;

the receiver circuitry further to receive a reflected superimposed communication and sensing signal and to perform waveform separation of the reflected superimposed communication and sensing signal to extract;

a sensing waveform and a communication waveform from the reflected superimposed communication and sensing signal; and a communication waveform from the communication signal received from the other transceiver.

12. The transceiver of claim 11, wherein the transmitter and the receiver utilize a same center frequency.

13. The transceiver of claim 11, wherein the transmitter comprises circuitry to superimpose the communication signal and the sensing signal at the transceiver to generate the superimposed communication and sensing signal.

14. The transceiver of claim 11, wherein the receiver comprises circuitry to perform self-interference (SI) cancellation of the reflected superimposed communication and sensing signal to suppress only direct SI while preserving multipath SI.

15. The transceiver of claim 11, wherein the receiver comprises circuitry to perform self-interference (SI) cancellation of the reflected communication and sensing signal.

16. The transceiver of claim 15, wherein SI cancellation of the reflected communication and sensing signal is performed using direct SI cancellation and multipath SI cancellation.

17. The transceiver of claim 16, wherein the direct SI cancellation and the multipath SI cancellation are implemented in parallel.

18. The transceiver of claim 16, wherein the direct SI cancellation and the multipath SI cancellation are implemented in series.

\* \* \* \* \*